United States Patent
Izawa et al.

(10) Patent No.: US 11,637,286 B2
(45) Date of Patent: *Apr. 25, 2023

(54) CARBONACEOUS MATERIAL FOR NEGATIVE ELECTRODE ACTIVE MATERIAL FOR NON-AQUEOUS ELECTROLYTE SECONDARY BATTERIES, NON-AQUEOUS ELECTROLYTE SECONDARY BATTERY NEGATIVE ELECTRODE, NON-AQUEOUS ELECTROLYTE SECONDARY BATTERY, AND PRODUCTION METHOD OF CARBONACEOUS MATERIAL

(71) Applicant: KURARAY CO., LTD., Kurashiki (JP)

(72) Inventors: Takafumi Izawa, Kurashiki (JP); Kengo Tachikawa, Kurashiki (JP); Hideharu Iwasaki, Kurashiki (JP)

(73) Assignee: KURARAY CO., LTD., Kurashiki (JP)

( * ) Notice: Subject to any disclaimer, the term of this patent is extended or adjusted under 35 U.S.C. 154(b) by 78 days.

This patent is subject to a terminal disclaimer.

(21) Appl. No.: 16/628,189

(22) PCT Filed: Jul. 4, 2018

(86) PCT No.: PCT/JP2018/025388
§ 371 (c)(1),
(2) Date: Jan. 2, 2020

(87) PCT Pub. No.: WO2019/009332
PCT Pub. Date: Jan. 10, 2019

(65) Prior Publication Data
US 2021/0098788 A1 Apr. 1, 2021

(30) Foreign Application Priority Data

Jul. 6, 2017 (JP) .............................. JP2017-133034

(51) Int. Cl.
| | |
|---|---|
| H01M 4/587 | (2010.01) |
| C01B 32/05 | (2017.01) |
| H01M 10/052 | (2010.01) |
| H01B 1/04 | (2006.01) |
| H01M 4/02 | (2006.01) |

(52) U.S. Cl.
CPC ............ *H01M 4/587* (2013.01); *C01B 32/05* (2017.08); *H01B 1/04* (2013.01); *H01M 10/052* (2013.01); *C01P 2002/78* (2013.01); *C01P 2002/82* (2013.01); *C01P 2006/12* (2013.01); *C01P 2006/14* (2013.01); *C01P 2006/40* (2013.01); *C01P 2006/80* (2013.01); *H01M 2004/021* (2013.01); *H01M 2004/027* (2013.01)

(58) Field of Classification Search
CPC ........... H01M 4/587; H01M 2004/021; H01M 2004/027; H01M 10/0525; C01B 32/05; H01B 1/04; C01P 2002/78; C01P 2002/82; C01P 2006/12; C01P 2006/14; C01P 2006/40; C01P 2006/80
USPC ............ 252/500, 502, 521.5, 521.6; 428/402
See application file for complete search history.

(56) References Cited

U.S. PATENT DOCUMENTS

| | | | |
|---|---|---|---|
| 2006/0093915 | A1 | 5/2006 | Lundquist et al. |
| 2010/0159346 | A1 | 6/2010 | Hinago et al. |
| 2012/0208089 | A1 | 8/2012 | Sawayama et al. |
| 2013/0252093 | A1 | 9/2013 | Yokomizo et al. |
| 2015/0180020 | A1 | 6/2015 | Komatsu et al. |
| 2015/0188137 | A1 | 7/2015 | Komatsu et al. |
| 2016/0064735 | A1 | 3/2016 | Tada et al. |
| 2017/0194105 | A1* | 7/2017 | Zhamu ................... H01G 11/32 |

(Continued)

FOREIGN PATENT DOCUMENTS

| | | |
|---|---|---|
| CN | 101641810 A | 2/2010 |
| CN | 103190019 A | 7/2013 |

(Continued)

OTHER PUBLICATIONS

Zhao "Mechanism for the preparation of carbon spheres from potato starch treated by NH4Cl." Carbon 47, 313-347 (Year: 2008).*
International Search Report dated Aug. 21, 2018 in PCT/JP2018/025388, 2 pages.
English translation of the International Preliminary Report on Patentability and Written Opinion of the International Searching Authority dated Jan. 16, 2020 in PCT/JP2018/025388 filed Jul. 4, 2018, 6 pages.
Extended European Search Report dated Feb. 11, 2021 in corresponding European Patent Application No. 18828189.3, 9 pages.
Amit A. Deshmukh et al.: "Carbon Spheres", Materials Science and Engineering: R: Reports, Elsevier, vol. 70, No. 1-2, XP027278833, Sep. 20, 2010, pp. 1-28, ISSN: 0927-796X [retrieved on Jul. 16, 2010].

(Continued)

*Primary Examiner* — Tri V Nguyen
(74) *Attorney, Agent, or Firm* — Oblon, McClelland, Maier & Neustadt, L.L.P.

(57) ABSTRACT

The present invention provides a carbonaceous material suitable for a negative electrode active material for non-aqueous electrolyte secondary batteries (e.g., lithium ion secondary batteries, sodium ion secondary batteries, lithium sulfur batteries, lithium air batteries) having high charge/discharge capacities, and preferably high charge/discharge efficiency and low resistance, a negative electrode comprising the carbonaceous material, a non-aqueous electrolyte secondary battery comprising the negative electrode, and a production method of the carbonaceous material. The present invention relates to a carbonaceous material having a nitrogen content obtained by elemental analysis of 3.5 mass % or more, a ratio of nitrogen content and hydrogen content ($R_{N/H}$) of 6 or more and 100 or less, a ratio of oxygen content and nitrogen content ($R_{O/N}$) of 0.1 or more and 1.0 or less, and a carbon interplanar spacing ($d_{002}$) observed by X-ray diffraction measurement of 3.70 Å or more.

12 Claims, No Drawings

(56) References Cited

U.S. PATENT DOCUMENTS

| | | | |
|---|---|---|---|
| 2018/0008968 A1* | 1/2018 | Pham-Huu | ............... B01J 27/20 |
| 2018/0323433 A1 | 11/2018 | Kawakami et al. | |

FOREIGN PATENT DOCUMENTS

| | | | | | |
|---|---|---|---|---|---|
| CN | 103250283 A | * | 8/2013 | .......... | H01M 10/052 |
| CN | 103992144 A | | 8/2014 | | |
| CN | 104709906 A | | 6/2015 | | |
| JP | 63121248 A | * | 5/1988 | ............ | H01M 4/583 |
| JP | 2006-83012 A | | 3/2006 | | |
| JP | 5233314 B2 | | 7/2013 | | |
| JP | 5477391 B2 | | 4/2014 | | |
| JP | 2015-164110 A | | 9/2015 | | |
| JP | 2017-84706 A | | 5/2017 | | |
| KR | 10-0817745 A | | 3/2008 | | |
| WO | WO 2014/034858 A1 | | 3/2014 | | |
| WO | WO 2014/038492 A1 | | 3/2014 | | |
| WO | WO 2015/129200 A1 | | 9/2015 | | |
| WO | WO 2015/137980 A1 | | 9/2015 | | |
| WO | WO 2017/022449 A1 | | 2/2017 | | |

OTHER PUBLICATIONS

Combined Taiwanese Office Action and Search Report dated Jun. 9, 2021 in Patent Application No. 107123153 (with English translation of Category of Cited Documents), 4 pages.

Combined Chinese Office Action and Search Report dated Aug. 4, 2022 in Patent Application No. 201880044917.8 (with English translation of Category of Cited Documents), 8 pages.

Korean Office Action dated Feb. 25, 2023, in Korean Patent Application No. 10-2019-7038268.

* cited by examiner

CARBONACEOUS MATERIAL FOR NEGATIVE ELECTRODE ACTIVE MATERIAL FOR NON-AQUEOUS ELECTROLYTE SECONDARY BATTERIES, NON-AQUEOUS ELECTROLYTE SECONDARY BATTERY NEGATIVE ELECTRODE, NON-AQUEOUS ELECTROLYTE SECONDARY BATTERY, AND PRODUCTION METHOD OF CARBONACEOUS MATERIAL

TECHNICAL FIELD

This patent application claims priority under the Paris Convention based on Japanese Patent Application No. 2017-133034 (filed Jul. 6, 2017) incorporated herein by reference in its entirety.

The present invention relates to a carbonaceous material suitable for a negative electrode active material for non-aqueous electrolyte secondary batteries, a non-aqueous electrolyte secondary battery negative electrode comprising the carbonaceous material, a non-aqueous electrolyte secondary battery comprising the negative electrode, and a production method of carbonaceous material.

BACKGROUND ART

Non-aqueous electrolyte secondary batteries such as lithium ion secondary batteries have high energy density and excellent output characteristics and are therefore widely used in small portable devices such as mobile phones and notebook computers. In recent years, the batteries are also increasingly applied to in-vehicle use for hybrid vehicles, electric vehicles, etc. For a negative electrode material for a lithium ion secondary battery, nitrogen-containing non-graphitizable carbon capable of being doped (charged) and dedoped (discharged) with lithium in an amount exceeding the theoretical capacity of 372 mAh/g of graphite has been developed (e.g., Patent Documents 1, 2, 3) and used.

Nitrogen-containing non-graphitizable carbon can be obtained, for example, by using a phenol resin as a carbon source and amine as a nitrogen source, or using a resin having an amine group such as an aniline resin as a carbon source, and performing a heat treatment. However, when nitrogen-containing non-graphitizable carbon is produced by using these raw materials, a step of fixing the nitrogen element is required for increasing a nitrogen element content, which reduces the productivity, and the fixing step tends to increase oxygen and hydrogen element contents as well.

The nitrogen element in the carbonaceous material acts as a lithium ion storage site, has smaller adsorption/desorption energies as compared to when lithium ions are stored in voids and defect portions between carbon layers and between carbon crystals, and therefore allows efficient ionic migration, which tends to lead to lower resistance.

PRIOR ART DOCUMENTS

Patent Documents

Patent Document 1: Japanese Laid-Open Patent Publication No. 2006-083012
Patent Document 2: Japanese Patent No. 5233314
Patent Document 3: Japanese Patent No. 5477391

SUMMARY OF THE INVENTION

Problem to be Solved by the Invention

Studies are recently conducted on application of lithium ion secondary batteries to in-vehicle use, and a further increase in capacity of lithium ion secondary batteries is demanded. To further improve input/output characteristics of non-aqueous electrolyte secondary batteries, a carbonaceous material providing a battery with low internal resistance may be required.

Therefore, an object of the present invention is to provide a carbonaceous material suitable for a negative electrode active material for non-aqueous electrolyte secondary batteries (e.g., lithium ion secondary batteries, sodium ion secondary batteries, lithium sulfur batteries, lithium air batteries) having high charge/discharge capacities, and preferably high charge/discharge efficiency and low resistance, a negative electrode comprising the carbonaceous material, a non-aqueous electrolyte secondary battery comprising the negative electrode, and a production method of the carbonaceous material.

Means for Solving Problem

The present inventors found that the object can be achieved by a carbonaceous material of the present invention described below.

Therefore, the present invention comprises the following preferred aspects.

[1] A carbonaceous material having a nitrogen element content of 3.5 mass % or more obtained by elemental analysis, a ratio of nitrogen element content and hydrogen element content ($R_{N/H}$) of 6 or more and 100 or less, a ratio of oxygen element content and nitrogen element content ($R_{O/N}$) of 0.1 or more and 1.0 or less, and a carbon interplanar spacing ($d_{002}$) observed by X-ray diffraction measurement of 3.70 Å or more.

[2] The carbonaceous material according to [1], wherein a value of half-value width of a peak near 1360 cm$^{-1}$ and a value of half-value width of a peak near 1650 cm$^{-1}$ of the Raman spectrum observed by laser Raman spectroscopy exceed 250 cm$^{-1}$ and 100 cm$^{-1}$, respectively.

[3] The carbonaceous material according to [1] or [2], wherein a specific surface area obtained by a BET method is 100 m$^2$/g or more, and wherein a pore volume represented by a sum of a micropore volume and a mesopore volume is 0.08 mL/g or more.

[4] The carbonaceous material according to [1] or [2], wherein a specific surface area obtained by a BET method is 70 m$^2$/g or less, and wherein a pore volume represented by a sum of a micropore volume and a mesopore volume is 0.05 mL/g or less.

[5] The carbonaceous material according to any one of [1] to [4], wherein an oxygen element content exceeds 1.5 mass %.

[6] The carbonaceous material according to any one of [1] to [5], wherein the carbonaceous material is derived from a saccharide.

[7] The carbonaceous material according to any one of [1] to [5], wherein the carbonaceous material is for use as a negative electrode active material for non-aqueous electrolyte secondary batteries.

[8] A non-aqueous electrolyte secondary battery negative electrode comprising: the carbonaceous material according to [7].

[9] A non-aqueous electrolyte secondary battery comprising: the non-aqueous electrolyte secondary battery negative electrode according to [8].

[10] A production method of the carbonaceous material according to any one of [1] to [7], comprising the steps of:

(1) mixing a saccharide with a substance capable of generating ammonia gas;

(2) increasing a temperature of an obtained mixture in an inert gas atmosphere at a temperature increase rate of 100° C./hour or more to a predetermined temperature between 500 and 1200° C.; and (3) applying a heat treatment at a temperature of 500 to 1200° C. with an inert gas at a flow rate of 0.5 to 5.0 L/min relative to 5 g of the saccharide to obtain a char.

[11] A production method of the carbonaceous material according to any one of [1] to [7], comprising the steps of:

(1) mixing a saccharide with a substance capable of generating ammonia gas;

(2A) increasing a temperature of an obtained mixture in an inert gas atmosphere at a temperature increase rate of 100° C./hour or more to a first predetermined temperature between 500 and 1000° C.;

(3A) applying a heat treatment at a temperature of 500 to 1000° C. with an inert gas at a flow rate of 0.5 to 5.0 L/min relative to 5 g of the saccharide to obtain a char;

(2B) increasing a temperature of the obtained char in an inert gas atmosphere at a temperature increase rate of 100° C./hour or more to a second predetermined temperature between 800 and 1400° C.; and (3B) applying a heat treatment at a temperature of 800 to 1400° C. with an inert gas at a flow rate of 0.5 to 5.0 L/min relative to 5 g of the char.

Effect of the Invention

The non-aqueous electrolyte secondary battery using the negative electrode comprising the carbonaceous material of the present invention has high charge/discharge capacities and preferably high charge/discharge efficiency as well as low resistance.

MODES FOR CARRYING OUT THE INVENTION

Embodiments of the present invention will now be described in detail. The scope of the present invention is not limited to the embodiments in this description, and various modifications can be made without departing from the spirit of the present invention.

In a carbonaceous material of the present invention, a nitrogen element content obtained by elemental analysis is 3.5 mass % or more. The nitrogen element content in the carbonaceous material less than 3.5 mass % reduces sites for adsorption/desorption of lithium ions during charge/discharge and tends to decrease charge/discharge capacities. From the viewpoint of achieving a sufficient discharge capacity, the nitrogen element content in the carbonaceous material of the present invention is preferably 3.55 mass % or more, more preferably 3.65 mass % or more, further preferably 3.75 mass % or more, still further preferably 3.85 mass % or more. If the nitrogen element content in the carbonaceous material of the present invention is too large, the carbonaceous material is easily distorted in structure so that a layered structure cannot be maintained, and therefore, the sites for adsorption/desorption of lithium ions are reduced. Additionally, nitrogen not taken into the carbon skeleton is expected to exist as a surface functional group such as —NH$_2$ group, and if an amount of such a surface functional group increases, an irreversible side reaction possibly occurring during charge and discharge cannot be suppressed, resulting in a reduction in the discharge capacity and a reduction in the charge/discharge efficiency. From the viewpoint of suppressing the irreversible side reaction during charge and discharge and facilitating increases in the discharge capacity and the charge/discharge efficiency, the nitrogen element content in the carbonaceous material of the present invention is preferably 5.5 mass % or less, more preferably 5.2 mass % or less, further preferably 5.0 mass % or less, still further preferably 4.7 mass % or less, particularly preferably 4.5 mass % or less. Details of measurement of the nitrogen element content are as described later, and the measurement is performed an elemental analysis method (inert gas dissolution method). A method for adjusting the nitrogen element content to the range is not limited in any way and, for example, the method can comprise mixing a saccharide with a substance capable of generating ammonia gas, increasing temperature at 100° C./hour or more in an inert gas atmosphere, and performing a heat treatment at a temperature of 500 to 1200° C. with an inert gas flow rate of 0.5 to 5.0 L/min relative to 5 g of the saccharide. Particularly, if the inert gas flow rate is made larger or the temperature increase rate is too small, the nitrogen element in the carbonaceous material is easily desorbed so that the nitrogen element amount in the obtained carbonaceous material is reduced, and therefore, adjustments may be made in the inert gas flow rate, the temperature increase rate, and the heat treatment temperature. The nitrogen element content within the range also provides an effect that an impedance value is small after charge and discharge are performed multiple times (e.g., two, three, five or more times).

In the carbonaceous material of the present invention, a hydrogen element content obtained by elemental analysis is preferably 0.50 mass % or less, more preferably 0.40 mass % or less, further preferably 0.35 mass % or less. The hydrogen element content in the carbonaceous material not more than the upper limit is preferable from the viewpoint of reducing a carbon edge portion, expanding a carbon plane, and facilitating movement of electrons. The hydrogen element content in the carbonaceous material of the present invention is preferably 0.10 mass % or more, more preferably 0.15 mass % or more, from the viewpoint of facilitating adsorption/desorption of lithium ions. Details of measurement of the hydrogen element content are as described later, and the measurement is performed by an elemental analysis method (inert gas dissolution method). A method for adjusting the hydrogen element content to the range is not limited in any way and, for example, the method can comprise mixing a saccharide with a substance capable of generating ammonia gas, increasing temperature at 100° C./hour or more in an inert gas atmosphere, and performing a heat treatment at a temperature of 500 to 1200° C. with an inert gas flow rate of 0.5 to 5.0 L/min relative to 5 g of the saccharide.

In the carbonaceous material of the present invention, from the viewpoint of improving an affinity with an electrolytic solution to facilitate transfer of electrons between the carbonaceous material and the electrolytic solution and reduce resistance, an oxygen element content obtained by elemental analysis is preferably 0.9 mass % or more, more preferably 1.10 mass % or more, and further preferably more than 1.50 mass %. On the other hand, if the oxygen element content is too large, an irreversible side reaction possibly occurring during charge and discharge cannot be suppressed, resulting in a reduction in the discharge capacity and a reduction in the charge/discharge efficiency. From the viewpoint of suppressing the irreversible side reaction during charge and discharge and facilitating increases in the discharge capacity and the charge/discharge efficiency, the oxygen element content in the carbonaceous material of the present invention is preferably 3.0 mass % or less, more preferably 2.75 mass % or less, further preferably 2.50 mass % or less. If higher discharge capacity and charging/discharging efficiency are required, the oxygen element content in the carbonaceous material of the present invention not more than 1.5 mass % is also preferable. Details of measurement of the oxygen element content are as described later, and the measurement is performed by an elemental analysis method (inert gas dissolution method). A method for adjusting the oxygen element content to the range is not limited in any way and, for example, the method can comprise mixing a saccharide with a substance capable of generating ammonia gas, increasing temperature at 100° C./hour or more in an inert gas atmosphere, and performing a heat treatment at a temperature of 500 to 1200° C. with an inert gas flow rate of 0.5 to 5.0 L/min relative to 5 g of the saccharide.

In the carbonaceous material of the present invention, a ratio $R_{N/H}$ between the nitrogen element content and the hydrogen element content (nitrogen element content/hydrogen element content) is 6 or more and 100 or less, preferably 10 to 80, more preferably 11 to 60, further preferably 12 to 50, from the viewpoint of increasing the nitrogen element content to facilitate an increase in the discharge capacity. A ratio $R_{O/N}$ between the oxygen element content and the nitrogen element content (oxygen element content/nitrogen element content) is 0.10 to 1.0, preferably 0.15 to 0.90, more preferably from 0.20 to 0.80, further preferably from 0.25 to 0.70, from the viewpoint of increasing both the oxygen element content and the nitrogen element content to facilitate a reduction in the resistance. The ratio $R_{N/H}$ between the nitrogen element content and the hydrogen element content is calculated by an equation $R_{N/H}$=nitrogen element content/hydrogen element content from the nitrogen element content and the hydrogen element content measured as described above, and the ratio $R_{O/N}$ between the oxygen element content and the nitrogen element content is calculated from an equation $R_{O/N}$=oxygen element content/hydrogen element content from the oxygen element content and the nitrogen element content measured as described above.

In the carbonaceous material of the present invention, a carbon interplanar spacing ($d_{002}$) calculated by the Bragg equation from a peak position (diffraction angle 2θ) observed by a powder X-ray diffraction method is 3.70 Å or more. For example, when the carbon planes are closest to each other as in graphite, $d_{002}$ is about 3.35 to 3.40 Å, and if $d_{002}$ exceeds 4.00 Å, the carbon planes cannot interact with each other and may become unable to maintain a layer structure. From the viewpoint of efficient movement of lithium ions, the carbonaceous material of the present invention preferably has $d_{002}$ widened to a degree not exceeding 4.00 Å. Therefore, a range of $d_{002}$ in the carbonaceous material of the present invention is usually 3.70 Å to 4.00 Å, preferably 3.74 Å to 3.95 Å, more preferably 3.76 Å to 3.90 Å.

In the carbonaceous material of the present invention, a value of half-value width of a peak near 1360 $cm^{-1}$ of the Raman spectrum observed by laser Raman spectroscopy is preferably in a range exceeding 250 $cm^{-1}$. The peak near 1360 $cm^{-1}$ is a Raman peak generally called a D band, which is a peak attributable to disturbance/defect of the graphite structure. The peak near 1,360 $cm^{-1}$ is usually observed in a range of 1345 $cm^{-1}$ to 1375 $cm^{-1}$, preferably 1350 $cm^{-1}$ to 1370 $cm^{-1}$. In the carbonaceous material of the present invention, a value of half-value width of a peak near 1650 $cm^{-1}$ of the Raman spectrum observed by laser Raman spectroscopy is preferably in a range exceeding 100 $cm^{-1}$. The peak near 1650 $cm^{-1}$ is a Raman peak generally called a G band, which is a peak attributable to disturbance/defect of the graphite structure. The peak near 1,650 $cm^{-1}$ is usually observed in a range of 90 $cm^{-1}$ to 120 $cm^{-1}$, preferably in a range of 100 $cm^{-1}$ to 110 $cm^{-1}$.

These half-value widths are related to the amount of disturbance/defect of the graphite structure contained in the carbonaceous material. Such structural disturbances may be caused by introduction of the nitrogen element into the carbon skeleton. If the half-value width of the Raman peak in the D band is 250 $cm^{-1}$ or less, structural development excessively proceeds, and the development of the graphite structure tends to prevent lithium ions from entering and exiting efficiently. This may cause problems such as an increase in resistance. From the viewpoint of facilitating a reduction in resistance, the half-value width of the peak near 1360 $cm^{-1}$ is preferably in the range exceeding 250 $cm^{-1}$, more preferably 260 $m^{-1}$ or more, and further preferably 270 $cm^{-1}$ or more. If the half-value width is greater than 300 $cm^{-1}$, the graphite structure contained in the carbonaceous material becomes difficult to maintain, and an amorphous material increases, which tends to decrease sites that may store lithium. This may cause a reduction in storage amount of lithium ions and a reduction in the discharge capacity. From such a viewpoint, the half-value width of the peak near 1360 $cm^{-1}$ is preferably 300 $cm^{-1}$ or less. If the half-value width of the Raman peak in the G band is 100 $cm^{-1}$ or less, the structural development excessively proceeds, and the development of the graphite structure tends to prevent lithium ions from entering and exiting efficiently. This may cause problems such as an increase in resistance. From the viewpoint of facilitating a reduction in resistance, the half-value width of the peak near 1650 $cm^{-1}$ is preferably more than 100 $cm^{-1}$, more preferably 102 $cm^{-1}$ or more, further preferably 105 $cm^{-1}$ or more, and usually 115 $cm^{-1}$ or less, preferably 110 $cm^{-1}$ or less, more preferably 107 $cm^{-1}$ or less.

According to the preferred carbonaceous material of the present invention having a value of half-value width of the peak near 1360 $cm^{-1}$ of the Raman spectrum observed by laser Raman spectroscopy in the range exceeding 250 $cm^{-1}$ and the hydrogen element content obtained by elemental analysis of 0.50 mass % or less, although the carbon structure is significantly disturbed, a carbon edge portion is relatively small, and therefore, the lithium ion transport efficiency is increased, so that low resistance and high charge/discharge efficiency are achieved.

The Raman spectrum is measured by using a Raman spectroscope (e.g., Raman spectroscope "LabRAM ARAMIS (VIS)" manufactured by HORIBA, Ltd.). Specifically, for example, after setting of measurement target particles on an observation stage and focusing an objective lens at magnification of 100 times, the measurement is performed while applying a 532 nm argon ion laser light into a measurement cell with an exposure time of 1 second, an accumulation number of 100, and a measurement range of 50 to 2000 $cm^{-1}$.

A method for adjusting the half-value width of the peak near 1360 $cm^{-1}$ and the half-value width of the peak near 1650 $cm^{-1}$ to the ranges is not limited in any way and, for example, the method can comprise mixing a saccharide with a substance capable of generating ammonia gas, increasing temperature at 100° C./hour or more in an inert gas atmosphere, and performing a heat treatment at a temperature of 500 to 1200° C. with an inert gas flow rate of 0.5 to 5.0 L/min relative to 5 g of the saccharide.

A specific surface area obtained by a nitrogen adsorption BET method of the carbonaceous material of the present invention is preferably 100 m$^2$/g or more, more preferably 150 m$^2$/g or more, further preferably 200 m$^2$/g or more from the viewpoint of facilitating permeation of an electrolytic solution and facilitating a reduction in battery resistance. The specific surface area of the carbonaceous material not less than the lower limit also provides an effect that an impedance value is small after charge and discharge are performed multiple times (e.g., two, three, five or more times). From the viewpoint of reducing the hygroscopicity of the carbonaceous material to suppress generation of acid and gas accompanying the hydrolysis of an electrolytic solution and water due to moisture present in the carbonaceous material and the viewpoint of reducing a contact area between air and the carbonaceous material to suppress oxidation of the carbonaceous material itself, the specific surface area is preferably 400 m$^2$/g or less, more preferably 350 m$^2$/g or less, and further preferably 300 m$^2$/g or less. Details of measurement of the specific surface area by the nitrogen adsorption BET method are as described later.

If it is required to further reduce the hygroscopicity of the carbonaceous material to suppress generation of acid and gas accompanying the hydrolysis of an electrolytic solution and water due to moisture present in the carbonaceous material or it is required to reduce a contact area between air and the carbonaceous material to suppress oxidation of the carbonaceous material itself, the specific surface area obtained by the nitrogen adsorption BET method of the carbonaceous material of the present invention is preferably 70 m$^2$/g or less, more preferably 60 m$^2$/g or less, further preferably 40 m$^2$/g or less, still further preferably 30 m$^2$/g or less, and particularly preferably 20 m$^2$/g or less, most preferably, 12 m$^2$/g or less.

A method for adjusting the specific surface area to the range is not limited in any way and, for example, the method can comprise mixing a saccharide with a substance capable of generating ammonia gas, increasing temperature at 100° C./hour or more in an inert gas atmosphere, and performing a heat treatment at a temperature of 500 to 1200° C. with an inert gas flow rate of 0.5 to 5.0 L/min relative to 5 g of the saccharide.

In the carbonaceous material of the present invention, from the viewpoint of facilitating permeation of an electrolytic solution and facilitating a reduction in battery resistance, a mesopore volume calculated by the DFT method is preferably 0.01 mL/g or more, more preferably 0.02 mL/g or more. The mesopore volume not less than the lower limit is preferable since pore clogging due to a decomposition product generated during repeated charge and discharge can be suppressed so that an increase in resistance is easily avoided. From the viewpoint of enabling suppression of a bulk density reduction and facilitating an increase in electrode density, the mesopore volume is preferably 0.07 mL/g or less, more preferably 0.06 mL/g or less, further preferably 0.05 mL/g or less. In this description, mesopores are pores having a pore size (pore diameter) of 2 nm or more and 50 nm or less in the DFT method.

On the other hand, in the carbonaceous material of the present invention, if it is required to further suppress a bulk density reduction to increase the electrode density or it is required to suppress a side reaction in a charge/discharge process to further reduce an irreversible capacity, the mesopore volume calculated by the DFT method is preferably 0.02 mL/g or less, more preferably 0.01 mL/g or less.

In the carbonaceous material of the present invention, from the viewpoint of easily causing adsorption/desorption of Li ions, a micropore volume calculated by the DFT method is preferably 0.03 mL/g or more, more preferably 0.04 mL/G or more, further preferably 0.05 mL/g or more. From the viewpoint of facilitating suppression of a reaction between the carbonaceous material and moisture caused during charge/discharge due to moisture adsorption etc., the micropore volume is preferably 0.15 mL/g or less, preferably 0.12 mL/g or less, further preferably 0.10 mL/g or less. In this description, micropores are pores having a pore size (pore diameter) less than 2 nm in the DFT method.

On the other hand, in the carbonaceous material of the present invention, if it is required to further suppress the reaction between the carbonaceous material and moisture caused during charge/discharge due to moisture adsorption etc., the micropore volume calculated by the DFT method is preferably 0.03 mL/g or less, more preferably 0.01 mL/g or less.

The DFT method is an analysis technique using molecular dynamics and a computer simulation method to calculate an equilibrium density profile of gas adsorbed to a surface and pores of an adsorbed body so that adsorption/desorption isotherm, adsorption heat, etc. can be calculated. Since this analysis method is applicable to the entire region of micropores and mesopores, the micropore volume, the mesopore volume, and the micropore/mesopore distribution can be measured at the same time. In the present invention, the micropore volume and the mesopore volume can be calculated by applying the DFT method to the nitrogen adsorption/desorption isotherm measured by the nitrogen adsorption method.

In the carbonaceous material of the present invention, regarding a pore volume represented by the sum of the micropore and mesopore volumes respectively calculated by the method (calculated by the equation of mesopore volume+micropore volume and hereinafter referred to also as "mesopore volume+micropore volume"), from the viewpoint of obtaining a carbonaceous material suitable for fabricating a battery having a low internal resistance, the mesopore volume+micropore volume is preferably 0.08 mL/g or more. Although the reason why the above effect can be obtained is not clear, a size of pores likely to be clogged due to repeated charge and discharge depends on types of an electrolytic solution and a binder to be used and has no fixed rule. Therefore, it is considered that a low resistance value is maintained when a certain level or more of the micropore volume or the mesopore volume is present. An upper limit of the mesopore volume+micropore volume is 0.30 mL/g or less, for example. The mesopore volume+micropore volume within the range also provides an effect that an impedance value is small after charge and discharge are performed multiple times (e.g., two, three, five or more times).

A method for adjusting the mesopore volume and the micropore volume as well as the mesopore volume+micropore volume to the range is not limited in any way and, for example, the method can comprise mixing a saccharide with a substance capable of generating ammonia gas, increasing temperature at 100° C./hour or more in an inert gas atmosphere, and performing a heat treatment at a temperature of 500 to 1200° C. with an inert gas flow rate of 0.5 to 5.0 L/min relative to 5 g of the saccharide.

On the other hand, in the carbonaceous material of the present invention, from the viewpoint of further reducing an amount of moisture adsorption and suppressing an increase in irreversible capacity, the mesopore volume+micropore volume respectively calculated by the method is 0.07 mL/g or less, more preferably 0.05 mL/g or less, further preferably 0.03 mL/g or less. In this case, a lower limit of the mesopore volume+micropore volume is 0.001 mL/g or more, for example.

A method for adjusting the mesopore volume and the micropore volume as well as the mesopore volume+micropore volume to the range is not limited in any way and, for example, the method can comprise mixing a saccharide with a substance capable of generating ammonia gas, increasing temperature at 100° C./hour or more in an inert gas atmosphere, performing a heat treatment at a first predetermined temperature between 500 to 1000° C. with an inert gas flow rate of 0.5 to 5.0 L/min relative to 5 g of the saccharide, increasing a temperature of an obtained char at 100° C./hour or more in an inert gas atmosphere, performing a heat treatment at a second predetermined temperature between 800 to 1400° C. with an inert gas flow rate of 0.5 to 5.0 L/min relative to 5 g of the saccharide.

An average particle diameter ($D_{50}$) of the carbonaceous material of the present invention is preferably 2 to 30 μm from the viewpoint of coatability during electrode fabrication. The average particle diameter not less than the lower limit is preferable since an increase in specific surface area and an increase in reactivity with the electrolytic solution due to fine powder in the carbonaceous material are suppressed and an increase in irreversible capacity is easily suppressed. Additionally, when a negative electrode is produced by using the obtained carbonaceous material, voids formed in the carbonaceous material can be ensured and the movement of lithium ion in the electrolytic solution is hardly suppressed. From such a viewpoint, the average particle diameter ($D_{50}$) of the carbonaceous material of the present invention is more preferably 3 μm or more, further preferably 4 μm or more, particularly preferably 5 μm or more, most preferably 7 μm or more. On the other hand, the average particle diameter not more than the upper limit is preferable since a small diffusion free path of lithium ions in the particles facilitates provision of rapid charge and discharge. Furthermore, in lithium ion secondary batteries, it is important to increase an electrode area for improvement of input/output characteristics, and therefore, a coating thickness of an active material applied to a collector plate needs to be reduced at the time of electrode preparation. To reduce the coating thickness, it is necessary to reduce the particle diameter of the active material. From such a viewpoint, the average particle diameter is more preferably 20 μm or less, further preferably 18 μm or less, particularly preferably 16 μm or less, most preferably 15 μm or less. $D_{50}$ is the particle diameter at which the cumulative volume is 50% and can be obtained by measuring a particle size distribution with a laser scattering method using a particle diameter/particle size distribution measuring device ("Microtrac MT3300EXII" manufactured by MicrotracBEL), for example.

The present invention also provides a production method for a carbonaceous material suitable for a negative electrode active material or a conductive material for non-aqueous electrolyte secondary batteries (e.g., lithium ion secondary batteries, sodium ion secondary batteries, lithium sulfur batteries, lithium air batteries) having high charge/discharge capacities and low resistance. The production method is a method comprising the steps of:

(1) mixing a saccharide with a substance capable of generating ammonia gas;

(2) increasing a temperature of an obtained mixture in an inert gas atmosphere at a temperature increase rate of 100° C./hour or more to a predetermined temperature between 500 and 1200° C.; and (3) applying a heat treatment at a temperature of 500 to 1200° C. with an inert gas at a flow rate of 0.5 to 5.0 L/min relative to 5 g of the saccharide to obtain a char, and the carbonaceous material of the present invention can be obtained by this method. The carbonaceous material can be obtained by a usual method, for example, by pulverizing the char with a ball mill or a jet mill.

In another embodiment, if it is required to increase the electrode density, or it is required to suppress a side reaction in a charge/discharge process to further reduce an irreversible capacity in a negative electrode active material or a conductive material for non-aqueous electrolyte secondary batteries (e.g., lithium ion secondary batteries, sodium ion secondary batteries, lithium sulfur batteries, lithium air batteries), the present invention relates to a production method for the carbonaceous material comprising the steps of (1) mixing a saccharide with a substance capable of generating ammonia gas;

(2A) increasing a temperature of an obtained mixture in an inert gas atmosphere at a temperature increase rate of 100° C./hour or more to a first predetermined temperature between 500 and 1000° C.;

(3A) applying a heat treatment at a temperature of 500 to 1000° C. with an inert gas at a flow rate of 0.5 to 5.0 L/min relative to 5 g of the saccharide to obtain a char;

(2B) increasing a temperature of the obtained char in an inert gas atmosphere at a temperature increase rate of 100° C./hour or more to a second predetermined temperature between 800 and 1400° C.; and (3B) applying a heat treatment at a temperature of 800 to 1400° C. with an inert gas at a flow rate of 0.5 to 5.0 L/min relative to 5 g of the char.

The saccharide used as a raw material is not particularly limited. Examples thereof comprise monosaccharides such as glucose, galactose, mannose, fructose, ribose, and glucosamine, disaccharides such as sucrose, trehalose, maltose, cellobiose, maltitol, lactobionic acid, and lactosamine, and polysaccharides such as starch, glycogen, agarose, pectin, cellulose, chitin, and chitosan. These saccharides can be used alone or in combination of two or more. Among these saccharides, glucose is preferable due to easy availability in large amount. By using such a saccharide as a raw material, the carbonaceous material derived from the saccharide can be obtained.

The substance capable of generating ammonia gas is not particularly limited and may be any substance capable of generating ammonia gas by heating, and examples of such a substance can comprise inorganic ammonium salts such as ammonium chloride, ammonium sulfate, ammonium carbonate, and ammonium nitrate, organic ammonium salts such as ammonium formate, ammonium acetate, ammonium oxalate, and diammonium hydrogen citrate, and aromatic amine hydrochlorides such as aniline hydrochloride and aminonaphthalene hydrochloride.

A mixing method of the saccharide and the substance capable of generating ammonia gas is not particularly limited, and dry mixing or wet mixing is usable.

In the case of dry mixing, the substance capable of generating ammonia gas can be added to the saccharide to obtain a mixture thereof. In this case, from the viewpoint of uniformly mixing the substance capable of generating ammonia gas and the saccharide, for example, the substance capable of generating ammonia gas and the saccharide are preferably powdered and mixed while being ground down with a mortar or pulverized with a ball mill.

In the case of wet mixing, for example, the saccharide can be dissolved in a solvent to prepare a solution, and the substance capable of generating ammonia gas can then be added to and mixed with the solution. The mixing may be achieved by scattering (spraying etc.) of the solution to the substance capable of generating ammonia gas. Alternatively, the saccharide may be added to and mixed with a solution prepared by dissolving the substance capable of generating ammonia gas in a solvent. After the mixing, the solvent may be evaporated if necessary. By such a treatment, a mixture of the saccharide and the substance capable of generating ammonia gas can be obtained. The solvent to be used is not particularly limited, and examples thereof comprise water, alcohol solvents (ethanol, methanol, ethylene glycol, isopropyl alcohol, etc.), ester solvents (ethyl acetate, butyl acetate, ethyl lactate, etc.), ether solvents (tetrahydrofuran, dimethoxyethane, 1, 4-dioxane, etc.), ketone solvents (acetone, 2-butanone, cyclopentanone, cyclohexanone, etc.), aliphatic hydrocarbon solvents (pentane, hexane, heptane, etc.), aromatic hydrocarbon solvents (toluene, xylene, mesitylene, etc.), nitrile solvents (acetonitrile, etc.), and chlorinated hydrocarbon solvents (dichloromethane, chloroform, chlorobenzene, etc.), and mixtures thereof. Uniform mixing of the saccharide and the substance capable of generating ammonia gas is effectively achieved when both are easily dissolved in the solvent, and therefore, water, an alcohol solvent, and a mixture thereof are preferable as the solvent. A method of evaporating the solvent is not particularly limited and, example thereof comprise a heat treatment and a pressure reduction treatment as well as a method of applying a combination thereof. The temperature of the heat treatment may be a temperature hardly causing the pyrolysis of the substance capable of generating ammonia gas or a temperature hardly causing the pyrolysis of the saccharide and is preferably 40 to 150° C., more preferably 50 to 120° C., further preferably 60 to 100° C., although varying depending on a type of the solvent.

An amount (addition amount) of the substance capable of generating ammonia gas to be mixed with the saccharide is preferably 0.5 molar equivalent or more, more preferably 0.7 molar equivalent or more, further preferably 0.9 molar equivalent or more, particularly preferably 1.0 molar equivalent or more, and preferably 5.0 molar equivalent or less, more preferably 4.0 molar equivalent or less, further preferably 3.5 molar equivalent or less. The amount of the substance capable of generating ammonia gas to be mixed is preferably not less than the lower limit since the nitrogen element is efficiently taken into the obtained carbonaceous material. When the amount of the substance capable of generating the ammonia gas to be mixed is not more than the upper limit, the nitrogen element can be prevented from being excessively taken in, and therefore, the carbon structure is not excessively disturbed, so that an non-aqueous electrolyte secondary battery comprising the obtained carbonaceous material exhibits high charge/discharge capacities and is also facilitated to exhibit a low resistance.

In the production method of the present invention, the mixture obtained from step (1) of mixing a saccharide with a substance capable of generating ammonia gas is increased in temperature and calcined [step (2) and step (3)] to obtain a char. Suitably, the mixture obtained from step (1) is increased in temperature and is subjected to a heat treatment at a temperature between 500 and 1200° C., preferably 600 and 1150° C., more preferably 700 and 1100° C., further preferably 800 and 1100° C. with an inert gas at a flow rate of 0.5 to 5.0 L/min, preferably a flow rate of 0.6 to 4.0 L/min, more preferably a flow rate of 0.7 to 3.0 L/min, relative to 5 g of the saccharide to obtain a char [step (3)]. An example of the inert gas is nitrogen gas. The temperature of the heat treatment applied with the inert gas may be a constant temperature and is not particularly limited as long as the temperature is within the range.

In this case, the mixture obtained from step (1) of mixing a saccharide with a substance capable of generating ammonia gas is suitably increased in temperature in an inert gas atmosphere such as nitrogen gas at a temperature increase rate of 100° C./hour or more, preferably 100 to 350° C./hour, more preferably 130 to 320° C./hour, further preferably 150 to 300° C./hour to a predetermined temperature between 500 and 1200° C., preferably 600 and 1150° C., more preferably 700 and 1100° C., further preferably 800 and 1100° C. [step (2)]. The temperature is increased at step (2) in an inert gas atmosphere, and the heat treatment may be applied with an inert gas at a flow rate of 0.5 to 5.0 L/min, preferably a flow rate of 0.6 to 4.0 L/min, more preferably a flow rate of 0.7 to 3.0 L/min, relative to 5 g of the saccharide.

The calcining step, i.e., a combination of the temperature increase step and the heat treatment step may be repeated multiple times, and when the step is repeated twice, suitably, at a temperature of 500 to 1000° C., preferably 520 to 950° C., more preferably 540 to 900° C., further preferably 560 to 850° C. at step (2A), the heat treatment is applied with an inert gas at a flow rate of 0.5 to 5.0 L/min, preferably a flow rate of 0.6 to 4.0 L/min, more preferably a flow rate of 0.7 to 3.0 L/min, relative to 5 g of the saccharide to obtain a char [step (3A)], and subsequently, at a temperature of 800 to 1400° C., preferably 840 to 1300° C., more preferably 880 to 1200° C., further preferably 920 to 1100° C. at step (2B), the heat treatment is applied with an inert gas at a flow rate of 0.5 to 5.0 L/min, preferably a flow rate of 0.6 to 4.0 L/min, more preferably a flow rate of 0.7 to 3.0 L/min, relative to 5 g of the saccharide to obtain a char [step (3B)].

The carbonaceous material of the present invention or the carbonaceous material obtained by the production method of the present invention can suitably be used as a negative electrode active material for non-aqueous electrolyte secondary batteries. The present invention also provides a non-aqueous electrolyte secondary battery negative electrode comprising the carbonaceous material of the present invention.

A production method of the non-aqueous electrolyte secondary battery negative electrode of the present invention will hereinafter specifically be described. The negative electrode of the present invention can be produced by adding a binder to the carbonaceous material of the present invention, adding an appropriate amount of a suitable solvent, kneading the material into an electrode mixture, then applying and drying the mixture on a collector plate made up of a metal plate etc., and performing pressure forming.

By using the carbonaceous material of the present invention, a highly-conductive electrode (negative electrode) can be produced without adding a conductive assistant. For the purpose of imparting higher conductivity, a conductive assistant can be added at the time of preparation of the electrode mixture as needed. Conductive carbon black, vapor-grown carbon fibers (VGCF), nanotube, etc. can be used as the conductive assistant. Although an addition amount of the conductive assistant varies depending on a type of the conductive assistant to be used, the expected conductivity may not be obtained if the addition amount is too small, and the dispersion in the electrode mixture may be poor if the amount is too large. From such a viewpoint, a preferable proportion of the conductive assistant to be added is 0.5 to 10 mass % (assuming the amount of the active material (carbonaceous material)+the amount of the binder+ the amount of the conductive assistant=100 mass %), more preferably 0.5 to 7 mass %, particularly preferably 0.5 to 5 mass %. The binder may be any binder not reactive with an electrolytic solution, such as PVDF (polyvinylidene fluoride), polytetrafluoroethylene, and a mixture of SBR (styrene-butadiene rubber) and CMC (carboxymethyl cellulose), without particular limitation. Among others, PVDF is preferable since PVDF having adhered to the surface of the active material is less likely to inhibit the lithium ion migration so that favorable input/output characteristics are obtained. Although a polar solvent such as N-methylpyrrolidone (NMP) is preferably used for dissolving the PVDF and forming a slurry, an aqueous emulsion such as SBR or CMC dissolved in water is also usable. If the addition amount of the binder is too large, the resistance of the obtained electrode becomes large, so that an increased internal resistance of the battery may deteriorate the battery characteristics. If the addition amount of the binder is too small, bonding between the particles of the negative electrode material and with the collector plate may be insufficient. Although a preferable addition amount of the binder varies depending on a type of the binder to be used, for example, the addition amount of the PVDF-based binder is preferably 3 to 13 mass %, more preferably 3 to 10 mass %. On the other hand, when water is used as a solvent of the binder, a plurality of binders is often mixed and used as in the case of a mixture of SBR and CMC, and the total amount of all the binders to be used is preferably 0.5 to 5 mass %, more preferably 1 to 4 mass %. The carbonaceous material of the present invention in the electrode mixture is preferably 80 mass % or more, more preferably 90 mass % or more. The carbonaceous material of the present invention in the electrode mixture is preferably 100 mass % or less, and more preferably 97 mass % or less.

An electrode active material layer is basically formed on both sides of the collector plate or may be formed on one side as necessary. The thicker electrode active material layer is preferable for higher capacity since the collector plate, a separator, etc. can be reduced. However, a wider electrode area opposed to a counter electrode is more advantageous for improvement of input/output characteristics, and therefore, when the electrode active material layer is too thick, the input/output characteristics may deteriorate. From the viewpoint of output during battery discharge, a thickness of the active material layer (per one side) is preferably 10 to 80 µm, more preferably 20 to 75 µm, further preferably 30 to 75 µm.

A non-aqueous electrolyte secondary battery of the present invention comprises the non-aqueous electrolyte secondary battery negative electrode of the present invention. The non-aqueous electrolyte secondary battery having the non-aqueous electrolyte secondary battery negative electrode comprising the carbonaceous material of the present invention has high charge/discharge capacities and charge/discharge efficiency as well as a low resistance.

When the negative electrode for a non-aqueous electrolyte secondary battery is formed by using the carbonaceous material of the present invention, various materials conventionally used or proposed for non-aqueous electrolyte secondary batteries can be used for other materials constituting the battery, such as a positive electrode material, the separator, and the electrolytic solution, without particular limitation.

For example, for the positive electrode material, layered oxide-based (represented by $LiMO_2$, where M is metal: e.g., $LiCoO_2$, $LiNiO_2$, $LiMnO_2$, or $LiNi_xCo_yMo_zO_2$ (x, y, and z represent composition ratios)), olivine-based (represented by $LiMPO_4$, where M is metal: e.g., $LiFePO_4$), and spinel-based (represented by $LiM_2O_4$, where M is metal: e.g., $LiMn_2O_4$) composite metal chalcogen compounds are preferable, and these chalcogen compounds may be mixed as needed. The positive electrode is formed by shaping these positive electrode materials together with a suitable binder and a carbonaceous material for imparting conductivity to an electrode such that a layer is formed on the conductive collector plate.

A non-aqueous solvent type electrolyte solution used in combination with these positive and negative electrodes is generally formed by dissolving an electrolyte in a non-aqueous solvent. For the non-aqueous solvent, for example, one or more organic solvents such as propylene carbonate, ethylene carbonate, dimethyl carbonate, diethyl carbonate, dimethoxyethane, diethoxyethane, γ-butyrolactone, tetrahydrofuran, 2-methyltetrahydrofuran, sulfolane, or 1,3-dioxolane can be used alone or in combination. For the electrolyte, $LiClO_4$, $LiPF_6$, $LiBF_4$, $LiCF_3SO_3$, $LiAsF_6$, LiCl, LiBr, $LiB(C_6H_5)_4$, or $LiN(SO_3CF_3)_2$ is used.

The non-aqueous electrolyte secondary battery is generally formed by immersing in the electrolytic solution the positive electrode and the negative electrode formed as described above and opposed to each other across a separator as needed. For such a separator, a permeable or liquid-permeable separator made of nonwoven fabric normally used for a secondary battery or other porous materials can be used. Alternatively, a solid electrolyte made of polymer gel impregnated with an electrolytic solution may be used instead of, or together with, the separator.

The carbonaceous material of the present invention is suitable for a carbonaceous material for a battery (typically, a non-aqueous electrolyte secondary battery for driving a vehicle) mounted on a vehicle such as an automobile. In the present invention, the vehicle refers to a vehicle generally known as an electric vehicle, a hybrid vehicle with a fuel cell and an internal combustion engine, etc. without particular limitation; however, the vehicle at least comprises a power source device provided with the battery, an electric drive mechanism driven by power supply from the power source device, and a control device controlling this mechanism. The vehicle may further comprise a mechanism provided with a power generation brake and a regenerative brake and converting energy from braking into electricity to charge the non-aqueous electrolyte secondary battery.

The carbonaceous material of the present invention has low resistance and therefore can also be used as an additive imparting conductivity to electrode materials for batteries, for example. Although the types of the batteries are not particularly limited, non-aqueous electrolyte secondary batteries and lead storage batteries are suitable. The carbonaceous material added to an electrode material of such a battery can form a conductive network, and a resulting increase in conductivity enables suppression of an irreversible reaction, so that the battery can have a longer service life.

EXAMPLES

The present invention will hereinafter specifically be described with examples; however, the present invention is not limited to these examples. A method for measuring physical property values of the carbonaceous material will hereinafter be described, and the physical property values described in this description comprising the examples are based on values obtained by the following methods.
(Elemental Analysis)

Elemental analysis was performed by using the oxygen/nitrogen/hydrogen analyzer EMGA-930 manufactured by HORIBA, Ltd.

The detection methods of the analyzer are oxygen: inert gas fusion-non-dispersive infrared absorption method (NDIR), nitrogen: inert gas fusion-thermal conductivity method (TCD), and hydrogen: inert gas fusion-non-dispersive infrared absorption method (NDIR) calibrated with an (oxygen/nitrogen) Ni capsule, $TiH_2$ (H standard sample), and SS-3 (N, O standard sample), and 20 mg of a sample having moisture content measured at 250° C. for about 10 minutes for a pretreatment was put into an Ni capsule and measured after 30 seconds of degasification in the elemental analyzer. The test was performed by analyzing three specimens, and an average value was used as an analysis value.
(X-Ray Diffraction)

X-ray diffraction measurement was performed by filling a carbonaceous material powder in a sample holder and using MiniFlex II manufactured by Rigaku Corporation. CuKα (λ=1.5418 Å) was used as a radiation source, and the scanning range was 10°<2θ<35°.
(Raman Spectrum)

Measurement was performed by using the Raman spectroscope ("LabRAM ARAMIS (VIS)" manufactured by HORIBA, Ltd.) with measurement target particles of carbonaceous material set on an observation stage and an objective lens focused at magnification of 100 times while applying an argon ion laser light. Details of measurement conditions are as follows.

Argon ion laser light wavelength: 532 nm
Laser power on sample: 15 mW
Resolution: 5 to 7 $cm^{-1}$
Measurement range: 50 to 2000 $cm^{-1}$
Exposure time: 1 second
Accumulation number: 100
Peak intensity measurement:

Baseline correction, automatic correction with Polynom/third-order

Peak search and fitting process, GaussLoren
(Specific Surface Area by Nitrogen Adsorption BET Method)

An approximate equation derived from a BET equation is described below.

$$\frac{p/p_0}{v(1-p/p_0)} = \frac{1}{v_m c} + \frac{(c-1)p}{v_m c} \frac{p}{p_0} \quad \text{[Mathematical 1]}$$

By using the approximate equation, $v_m$ is obtained by substituting an actually measured adsorption amount (v) at a predetermined relative pressure ($p/p_0$) by a multi-point method according to nitrogen adsorption at the liquid nitrogen temperature, and the specific surface area (SSA: in $m^2 g^{-1}$) of the sample was calculated by the following equation.

$$\text{specific surface area} = \left(\frac{v_m N a}{22400}\right) \times 10^{-18} \quad \text{[Mathematical 2]}$$

In the equation, $v_m$ is the adsorption amount ($cm^3/g$) required for forming a monomolecular layer on a sample surface, v is the actually measured adsorption amount ($cm^3/g$), $p_0$ is the saturated vapor pressure, p is the absolute pressure, c is the constant (reflecting the adsorption heat), N is the Avogadro's number $6.022 \times 10^{23}$, and a ($nm^2$) is the area occupied by adsorbate molecules on the sample surface (molecular occupied cross-sectional area).

Specifically, the amount of nitrogen adsorption to the carbonaceous material at the liquid nitrogen temperature was measured by using "Autosorb-iQ-MP" manufactured by Quantachrome as follows. After the carbonaceous material used as a measurement sample was filled in a sample tube and the sample tube was cooled to −196° C., the pressure was once reduced, and nitrogen (purity: 99.999%) was then adsorbed to the measurement sample at a desired relative pressure. An adsorbed gas amount v was defined as an amount of nitrogen adsorbed to the sample when the equilibrium pressure was reached at each desired relative pressure.

The adsorption isotherm obtained from the measurement of the nitrogen adsorption amount was analyzed by the DFT method, and a volume of pores having a pore size (pore diameter) less than 2 nm and a volume of pores having a pore size (pore diameter) of 2 nm or more and 50 nm or less are calculated as the micropore volume and the mesopore volume, respectively.
(Average Particle Diameter by Laser Scattering Method)

The average particle diameter (particle size distribution) of plant-derived char and the carbonaceous material was measured by the following method. The sample was put into an aqueous solution containing 5 mass % surfactant ("Toriton X100" manufactured by Wako Pure Chemical Industries), treated by an ultrasonic cleaner for 10 minutes or more, and dispersed in the aqueous solution. The particle size distribution was measured by using this dispersion. Particle size distribution measurement was performed by using a particle diameter/particle size distribution measuring device ("Microtrac MT3000EXII" manufactured by MicrotracBEL). $D_{50}$ is the particle diameter at which the cumulative volume is 50%, and this value was used as the average particle diameter.

Example 1

Glucose and ammonium chloride (1.1 mol per 1 mol of glucose) were mixed in a mortar. An obtained mixture was increased in temperature to 1000° C. in a nitrogen gas atmosphere. In this process, the temperature increase rate to 1000° C. was 240° C./hour (4° C./min). The mixture was then heat-treated at 1000° C. for 60 minutes under a nitrogen gas stream to perform a carbonization treatment and thereby obtain a char. In this process, a supply amount of nitrogen gas was 1 L/min per 5 g of glucose. Subsequently, the char was pulverized by a ball mill to obtain a carbonaceous material.

Example 2

A carbonaceous material was obtained by performing the treatments as in Example 1 except that ammonium sulfate was used instead of ammonium chloride.

Example 3

A carbonaceous material was obtained by performing the treatments as in Example 1 except that the addition amount of ammonium chloride was 0.33 mol per 1 mol of glucose.

Example 4

A carbonaceous material was obtained by performing the treatments as in Example 1 except that the addition amount of ammonium chloride was 3.3 mol per 1 mol of glucose.

Example 5

A carbonaceous material was obtained by performing the treatments as in Example 1 except that starch was used instead of glucose and diammonium hydrogen citrate was used instead of ammonium chloride (1.1 mol per 1 mol of monosaccharide unit of starch), that before the step of increasing the temperature of the obtained mixture to 1000° C. in a nitrogen gas atmosphere, the obtained mixture was increased in temperature to 600° C. in a nitrogen gas atmosphere with the temperature increase rate to 600° C. set to 240° C./hour (4° C./min), that the mixture was then heat-treated at 600° C. for 60 minutes under a nitrogen gas stream to perform a carbonization treatment and thereby obtain a char, and that the obtained char was subjected to the temperature increase step and the heat treatment step as in Example 1.

Example 6

A carbonaceous material was obtained by performing the treatments as in Example 5 except that the addition amount of diammonium hydrogen citrate used was 0.55 mol per 1 mol of monosaccharide unit of starch.

Comparative Example 1

A carbonaceous material was obtained as in Example 1 except that ammonium chloride was not mixed.

Comparative Example 2

A carbonaceous material was obtained by performing the treatments as in Comparative Example 1 except that coconut shell was used as the carbon source.

Comparative Example 3

A carbonaceous material was obtained by performing the treatments as in Example 1 except that coconut shell was used as the carbon source and ammonium chloride (36 mass % relative to the coconut shell) was mixed.

Comparative Example 4

A carbonaceous material was obtained by performing the treatments as in Example 1 except that the nitrogen gas supply amount during the carbonization treatment was 10 L/min per 5 g of glucose.

Comparative Example 5

In a three-necked flask equipped with a stirrer and a cooling tube, 100 parts of aniline, 697 parts of 37% formaldehyde aqueous solution, and 2 parts of oxalic acid were placed, reacted at 100° C. for 3 hours, and dehydrated to obtain 110 parts of aniline resin. The obtained aniline resin had a weight average molecular weight of about 700. A resin composition obtained by pulverizing and mixing 100 parts of the aniline resin obtained as described above and 10 parts of hexamethylenetetramine is treated in the order of the following steps (1) to (4) to obtain a carbonaceous material.

(1) Without performing reducing gas replacement, inert gas replacement, reducing gas circulation, or inert gas circulation, the composition was increased in temperature to 500° C. at a temperature increase time of 100° C./hour (1.7° C./min), subjected to a degreasing treatment at 500° C. for 2 hours, and then cooled to obtain a char.

(2) The char was pulverized with a ball mill to obtain a pulverized char.

(3) The temperature was increased to 1100° C. with a nitrogen gas supply amount of 3 L/min per 5 g of the pulverized char at a temperature increase rate of 100° C./hour (1.7° C./min) and then kept for 8 hours.

(4) The pulverized char was cooled to room temperature with a nitrogen gas supply amount of 3 L/min per 5 g of the pulverized char to obtain a carbonaceous material.

(Production of Electrode)

By using the carbonaceous materials obtained in Examples and Comparative Examples, respective negative electrodes were fabricated according to the following procedure.

A slurry was obtained by mixing 92 parts by mass of the carbonaceous material, 4 parts by mass of PVDF (polyvinylidene fluoride), and 90 parts by mass of NMP (N-methylpyrrolidone). The obtained slurry was applied to a copper foil having a thickness of 14 μm, dried, and then pressed to obtain an electrode having a thickness of 75 μm. The obtained electrode had a density of 0.8 to 1.0 g/cm$^3$.

(Impedance)

To the fabricated electrode, an amplitude of 10 mV was applied with 0 V defined as the center at 25° C. by using an electrochemical measurement device ("1255WB high-performance electrochemical measurement system" manufactured by Solartron) to measure a constant voltage AC impedance at a frequency of 10 mHz to 1 MHz, and real part resistance at frequencies of 1 kHz, 1 Hz, and 0.1 Hz was measured as impedance resistance.

(DC Resistance Value, Battery Initial Capacity, and Charge/Discharge Efficiency)

The electrode fabricated as described above was used as a working electrode, and metallic lithium was used as a counter electrode and a reference electrode. Propylene carbonate and ethylene glycol dimethyl ether were mixed and used as a solvent at a volume ratio of 1:1. In this solvent, 1 mol/L of LiClO$_4$ was dissolved and used as an electrolyte. A polypropylene film was used for the separator. A coin cell was fabricated in a glove box under an argon atmosphere.

For the lithium secondary battery having the structure described above, a charge/discharge test was performed after measuring DC resistance value before initial charge by using a charge/discharge test device ("TOSCAT" manufactured by Toyo System). Doping of lithium was performed at a rate of 70 mA/g with respect to the active material mass, and doping was performed to 1 mV relative to the lithium potential. A constant voltage of 1 mV relative to the lithium potential was further applied for 8 hours before terminating the doping. A capacity (mAh/g) at this point was defined as the charge capacity. Subsequently, dedoping was performed at a rate of 70 mA/g with respect to the active material mass to 2.5 V relative to the lithium potential, and a capacity discharged at this point was defined as the discharge capacity. The percentage of the discharge capacity/charge capacity was defined as the charge/discharge efficiency (initial charge/discharge efficiency) and was used as an index of the utilization efficiency of lithium ions in the battery. After the charge/discharge described above was repeated three times, the impedance was measured.

The carbonaceous material production conditions in Examples and Comparative Examples, the evaluation results of the physical properties of the obtained carbonaceous materials, and the evaluation results of the battery characteristics are respectively described in the following tables.

The battery fabricated by using the carbonaceous materials of Examples had a low resistance value and exhibited a high discharge capacity. Particularly, it was found that the impedance value was small after the charge/discharge measurement was performed three times. The batteries fabricated by using the carbonaceous materials of Examples 5 and 6 had a remarkable effect of reducing an irreversible capacity as compared to Comparative Examples and had high charging/discharging efficiency. On the other hand, in the case of the batteries fabricated by using the carbonaceous materials of Comparative Examples without $R_{N/H}$ or $R_{O/N}$ in a predetermined range or without a predetermined nitrogen content, a sufficiently low resistance value was not achieved, and the discharge capacity was not sufficient.

TABLE 1 carbonaceous material manufacturing conditions

| type | No. | raw material | | mixing ratio | calcining temperature | temperature increase rate during calcining | $N_2$ flow rate during calcining |
|---|---|---|---|---|---|---|---|
| | | carbon source | ammonium salt | mol ratio | °C. | °C./min | L/min |
| Example | 1 | glucose | $NH_4Cl$ | 1:1.1 | 1000 | 4 | 1 |
| | 2 | glucose | $(NH_4)_2SO_4$ | 1:1.1 | 1000 | 4 | 1 |
| | 3 | glucose | $NH_4Cl$ | 1:0.33 | 1000 | 4 | 1 |
| | 4 | glucose | $NH_4Cl$ | 1:3.3 | 1000 | 4 | 1 |
| | 5 | starch | diammonium hydrogen citrate | 1:1.1 | 1000 | 4 | 1 |
| | 6 | starch | diammonium hydrogen citrate | 1:0.55 | 1000 | 4 | 1 |
| Comparative Example | 1 | glucose | none | none | 1000 | 4 | 1 |
| | 2 | coconut shell | none | none | 1000 | 4 | 1 |
| | 3 | coconut shell | $NH_4Cl$ | 1:0.36 (mass ratio) | 1000 | 4 | 1 |
| | 4 | glucose | $NH_4Cl$ | 1:1.1 | 1000 | 4 | 10 |
| | 5 | aniline resin:formaldehyde:oxalic acid | | 100:697:2 | 1100 | 1.7 | 3 |

TABLE 2 carbonaceous material physical properties

| | | X-ray diffraction | Raman spectrum | | |
|---|---|---|---|---|---|
| type | No. | $d_{002}$ Å | D-band $cm^{-1}$ | G-band $cm^{-1}$ | R value $I_D/I_G$ |
| Example | 1 | 3.80 | 283 | 102 | 1.17 |
| | 2 | 3.82 | 294 | 108 | 1.28 |
| | 3 | 3.80 | 254 | 100 | 1.17 |
| | 4 | 3.75 | 288 | 103 | 1.21 |
| | 5 | 3.75 | 288 | 103 | 1.21 |
| | 6 | 3.80 | 276 | 102 | 1.18 |
| Comparative Example | 1 | 3.92 | 219 | 96 | 1.18 |
| | 2 | 3.79 | 246 | 97 | 1.08 |
| | 3 | 3.77 | 264 | 99 | 1.12 |
| | 4 | 3.89 | 244 | 97 | 1.16 |
| | 5 | 3.66 | 165 | 97 | 1.12 |

TABLE 3 carbonaceous material physical properties $N_2$ adsorption measurement

| type | No. | SSA $m^2g^{-1}$ | micropore $mLg^{-1}$ | mesopore $mLg^{-1}$ |
|---|---|---|---|---|
| Example | 1 | 260.7 | 0.0930 | 0.0612 |
| | 2 | 203.4 | 0.0975 | 0.0379 |
| | 3 | 116.3 | 0.0442 | 0.142 |
| | 4 | 180.2 | 0.0640 | 0.0284 |
| | 5 | 5.9 | 0.0009 | 0.0121 |
| | 6 | 9.1 | 0.0014 | 0.0061 |
| Comparative Example | 1 | 117.3 | 0.0416 | 0.0210 |
| | 2 | 45.2 | 0.0071 | 0.0172 |
| | 3 | 39.1 | 0.0052 | 0.0180 |
| | 4 | 72.5 | 0.0092 | 0.0234 |
| | 5 | 7.1 | 0.0015 | 0.0037 |

TABLE 4 carbonaceous material physical properties elemental analysis

| type | No. | O mass % | N mass % | H mass % | N/H ratio | O/N ratio |
|---|---|---|---|---|---|---|
| Example | 1 | 1.90 | 4.48 | 0.31 | 14.62 | 0.42 |
| | 2 | 1.76 | 4.81 | 0.23 | 21.10 | 0.37 |
| | 3 | 2.53 | 3.84 | 0.33 | 11.57 | 0.66 |
| | 4 | 2.64 | 5.17 | 0.30 | 17.15 | 0.51 |
| | 5 | 1.12 | 4.48 | 0.27 | 16.59 | 0.25 |
| | 6 | 1.39 | 4.43 | 0.27 | 16.41 | 0.31 |
| Comparative Example | 1 | 1.23 | 0.63 | 0.37 | 1.71 | 1.95 |
| | 2 | 1.91 | 1.14 | 0.54 | 2.09 | 1.68 |
| | 3 | 2.39 | 2.09 | 0.49 | 4.24 | 1.14 |
| | 4 | 1.21 | 0.92 | 0.25 | 3.68 | 1.32 |
| | 5 | 1.55 | 2.90 | 0.55 | 5.3 | 0.53 |

TABLE 5 carbonaceous material battery characteristics charge/discharge characteristics

| type | No. | discharge capacity mAhg$^{-1}$ | irreversible capacity mAhg$^{-1}$ | efficiency % |
|---|---|---|---|---|
| Example | 1 | 516 | 270 | 65.7 |
|  | 2 | 506 | 304 | 62.5 |
|  | 3 | 447 | 282 | 61.3 |
|  | 4 | 508 | 281 | 64.4 |
|  | 5 | 533 | 208 | 71.9 |
|  | 6 | 546 | 198 | 73.4 |
| Comparative Example | 1 | 460 | 273 | 62.8 |
|  | 2 | 361 | 261 | 58.0 |
|  | 3 | 410 | 291 | 58.5 |
|  | 4 | 405 | 242 | 62.6 |
|  | 5 | 412 | 237 | 63.5 |

TABLE 6 carbonaceous material battery characteristics charge/discharge characteristics

| type | No. | DC resistance during initial charge/discharge Ω | impedance during initial charge/discharge Ω | impedance (after charging/discharging 3 times) | | |
|---|---|---|---|---|---|---|
| | | | | 1 kHz Ω | 1 Hz Ω | 0.1 Hz Ω |
| Example | 1 | 410 | 9.1 | 5.0 | 6.2 | 7.1 |
|  | 2 | 401 | 9.7 | 4.9 | 6.0 | 7.0 |
|  | 3 | 500 | 9.9 | 5.2 | 6.1 | 7.2 |
|  | 4 | 405 | 9.3 | 4.9 | 6.0 | 7.3 |
|  | 5 | 658 | 10.8 | 5.0 | 6.1 | 7.2 |
|  | 6 | 693 | 10.9 | 5.3 | 6.3 | 7.2 |
| Comparative Example | 1 | 514 | 9.7 | 5.3 | 6.9 | 9.8 |
|  | 2 | 1037 | 12 | 6.9 | 9.2 | 11.2 |
|  | 3 | 1098 | 11 | 7.0 | 9.1 | 10.2 |
|  | 4 | 595 | 9.7 | 5.7 | 6.6 | 9.9 |
|  | 5 | 720 | 10.4 | 6.2 | 9.5 | 11.2 |

The invention claimed is:

1. A carbonaceous material having a nitrogen content of 3.5 mass % or more as measured by elemental analysis, a ratio of the nitrogen content and a hydrogen content ($R_{N/H}$) of 6 or more and 100 or less, a ratio of an oxygen content and the nitrogen content ($R_{O/N}$) of 0.1 or more and 1.0 or less, and a carbon interplanar spacing ($d_{002}$) observed by X-ray diffraction measurement of 3.70 Å or more,
wherein the carbonaceous material is derived from a saccharide.

2. The carbonaceous material according to claim 1, wherein the carbonaceous material has the ratio of the oxygen content and the nitrogen content ($R_{O/N}$) of 0.1 or more and 0.51 or less.

3. The carbonaceous material according to claim 1, wherein a value of half-value width of a peak near 1360 cm$^{-1}$ and a value of half-value width of a peak near 1650 cm$^{-1}$ of a Raman spectrum observed by laser Raman spectroscopy exceed 250 cm$^{-1}$ and 100 cm$^{-1}$, respectively.

4. The carbonaceous material according to claim 1, wherein a specific surface area measured by a BET method is 100 m$^2$/g or more, and wherein a pore volume represented by a sum of a micropore volume and a mesopore volume is 0.08 mL/g or more.

5. The carbonaceous material according to claim 1, wherein a specific surface area measured by a BET method is 70 m$^2$/g or less, and wherein a pore volume represented by a sum of a micropore volume and a mesopore volume is 0.05 mL/g or less.

6. The carbonaceous material according to claim 1, wherein the oxygen content exceeds 1.5 mass %.

7. A negative electrode active material for a non-aqueous electrolyte secondary battery, wherein the negative electrode active material comprises the carbonaceous material according to claim 1.

8. A non-aqueous electrolyte secondary battery negative electrode comprising the negative electrode active material according to claim 7.

9. A non-aqueous electrolyte secondary battery comprising the non-aqueous electrolyte secondary battery negative electrode according to claim 8.

10. A method of producing the carbonaceous material according to claim 1, the method comprising:
    (1) mixing a saccharide with a substance capable of generating ammonia gas to obtain a mixture;
    (2) increasing a temperature of the mixture in an inert gas atmosphere at a temperature increase rate of 100° C/hour or more to a predetermined temperature between 500 and 1200° C.; and
    (3) applying a heat treatment at a temperature of 500 to 1200° C. with an inert gas at a flow rate of 0.5 to 5.0 L/min relative to 5 g of the saccharide to obtain a char.

11. A method of producing the carbonaceous material according to claim 1, the method comprising:
    (1) mixing a saccharide with a substance capable of generating ammonia gas to obtain a mixture;
    (2A) increasing a temperature of the mixture in an inert gas atmosphere at a temperature increase rate of 100° C/hour or more to a first predetermined temperature between 500 and 1000° C.;
    (3A) applying a heat treatment at a temperature of 500 to 1000° C. with an inert gas at a flow rate of 0.5 to 5.0 L/min relative to 5 g of the saccharide to obtain a char;
    (2B) increasing a temperature of the char in an inert gas atmosphere at a temperature increase rate of 100° C/hour or more to a second predetermined temperature between 800 and 1400° C.; and
    (3B) applying a heat treatment at a temperature of 800 to 1400° C. with an inert gas at a flow rate of 0.5 to 5.0 L/min relative to 5 g of the char.

12. A negative electrode active material for a non-aqueous electrolyte secondary battery,
    wherein the negative electrode active material comprises a carbonaceous material having a nitrogen content of 3.75 mass % or more and 5.2 mass % or less as measured by elemental analysis, a ratio of the nitrogen content and a hydrogen content ($R_{N/H}$) of 11 or more and 21.10 or less, and the a ratio of an oxygen content and the nitrogen content ($R_{O/N}$) of 0.25 or more and 0.51 or less, and a carbon interplanar spacing ($d_{002}$) observed by X-ray diffraction measurement of 3.70 Å or more.

* * * * *